(12) United States Patent
Varada et al.

(10) Patent No.: US 12,182,008 B2
(45) Date of Patent: Dec. 31, 2024

(54) LABELLING WEB TRAFFIC ROUTING TO SUPPORT SOFTWARE TESTING

(71) Applicant: INTERNATIONAL BUSINESS MACHINES CORPORATION, Armonk, NY (US)

(72) Inventors: Sri Harsha Varada, Vizianagaram (IN); Pavan Kumar Penugonda, Anakapalle (IN); Akash U. Dhoot, Pune (IN); Pavan K Manda, Vishakapatnam (IN); Thomas Chang, Port Coquotlam (CA)

(73) Assignee: International Business Machines Corporation, Armonk, NY (US)

( * ) Notice: Subject to any disclaimer, the term of this patent is extended or adjusted under 35 U.S.C. 154(b) by 138 days.

(21) Appl. No.: 18/065,683

(22) Filed: Dec. 14, 2022

(65) Prior Publication Data

US 2024/0202101 A1    Jun. 20, 2024

(51) Int. Cl.
| | |
|---|---|
| *G06F 11/36* | (2006.01) |
| *G06F 8/60* | (2018.01) |
| *G06F 11/32* | (2006.01) |
| *H04L 41/0806* | (2022.01) |

(52) U.S. Cl.
CPC ............ *G06F 11/3688* (2013.01); *G06F 8/60* (2013.01); *G06F 11/3664* (2013.01); *G06F 11/3668* (2013.01); *G06F 11/323* (2013.01); *H04L 41/0806* (2013.01)

(58) Field of Classification Search
CPC .... G06F 8/60; G06F 11/3688; G06F 11/3664; G06F 11/32; G06F 11/3668; H04L 41/0806
See application file for complete search history.

(56) References Cited

U.S. PATENT DOCUMENTS

| | | | |
|---|---|---|---|
| 10,887,369 B2 | 1/2021 | Iliofotou | |
| 2015/0012838 A1* | 1/2015 | Hegstad | G06F 11/3688 715/745 |
| 2015/0347970 A1* | 12/2015 | Kirtane | G06F 11/3664 717/103 |
| 2019/0391911 A1* | 12/2019 | Benes | G06F 11/3688 |
| 2020/0112487 A1 | 4/2020 | Inamdar | |
| 2020/0242019 A1* | 7/2020 | Rodrigues | H04L 41/0806 |
| 2022/0066912 A1* | 3/2022 | Shetty | G06F 11/323 |

(Continued)

OTHER PUBLICATIONS

Kim/NamHong, KR 20000064184, (translation), Nov. 6, 2000, 5pgs <KR_20000064184.pdf>.*

(Continued)

*Primary Examiner* — Tuan A Vu
(74) *Attorney, Agent, or Firm* — Daniel M. Yeates (57) ABSTRACT

Computer technology for: (i) determining which version of a software service to use depending upon whether the user requesting the service is a beta tester, and (ii) if the user status of the user requesting a software service is beta tester then: (a) that user will have the newer, testing-phase version of the software service used to fulfill the software service request, and (b) the user will be given an opportunity to provide feedback on the effectiveness and/or performance of the service to effect the beta testing of the new version of the software service under test.

19 Claims, 4 Drawing Sheets

(56) References Cited

U.S. PATENT DOCUMENTS

2022/0200869 A1   6/2022   Erlingsson
2022/0210122 A1   6/2022   Levin

OTHER PUBLICATIONS

Li et al, CN 106161521, (translation), Sep. 10, 2019, 14 pgs <CN_106161521.pdf>.*
Zhang et al, CN 105339893, (translation), Jan. 4, 2019, 13 pgs <CN_105339893.pdf>.*
"Software as a Service," Wikipedia, Dec. 3, 2022, https://en.wikipedia.org/wiki/Software_as_a_service, 11 pages.
Ducott, R., "Two-phased Canary Rollout with Open Source Gloo," Kubernetes Blog, Apr. 22, 2020, 16 pages. https://kubernetes.io/blog/2020/04/two-phased-canary-rollout-with-gloo/.
Electric Bee, "How to: Canary Deployments with CloudBees Flow," CloudBees Blog, Jul. 3, 2017, 15 pages. https://www.cloudbees.com/blog/how-canary-deployments-cloudbees-flow.
Nichols, K., "Canary Deployment: What It Is and How to Use It," Cloudbees Blog, Mar. 20, 2020, https://rollout.io/blog/canary-deployment/ redirects to https://www.cloudbees.com/blog/canary-deployment/, 5 pages.

* cited by examiner

LABELLING WEB TRAFFIC ROUTING TO SUPPORT SOFTWARE TESTING

BACKGROUND

The present invention relates generally to the fields of: (i) software testing by having human users use the software and evaluate performance and/or locate errors (this is herein referred to as "beta testing," see additional definitional discussion below); and (ii) software provided as a service ("SaaS").

The Wikipedia entry for "software as a service" (as of 3 Dec. 2022) states in part as follows: "Software as a service . . . is a software licensing and delivery model in which software is licensed on a subscription basis and is centrally hosted. SaaS is also known as 'on-demand software' and Web-based/Web-hosted software. SaaS is considered to be part of cloud computing, along with infrastructure as a service (IaaS), platform as a service (PaaS), desktop as a service (DaaS), managed software as a service (MSaaS), mobile backend as a service (MBaaS), data center as a service (DCaaS), integration platform as a service (iPaaS), and information technology management as a service (ITMaaS). SaaS apps are typically accessed by users of a web browser (a thin client). SaaS became a common delivery model for many business applications, including office software, messaging software, payroll processing software, DBMS software, management software, CAD software, development software, gamification, virtualization, accounting, collaboration, customer relationship management (CRM), management information systems (MIS), enterprise resource planning (ERP), invoicing, field service management, human resource management (HRM), talent acquisition, learning management systems, content management (CM), geographic information systems (GIS), and service desk management. SaaS has been incorporated into the strategy of nearly all enterprise software companies." (footnotes omitted)

It is noted that an entire app (such as a word processing program) can be provided as a service and/or different pieces of functionality used by an app, or other computer program, may be provided as a service. For purposes of this document, performing on-demand instructions and/or functionality of any piece of computer code will be referred to herein as a "software service," regardless of whether the software service is an entire app, a set of functionality that is performed on behalf of other computer program(s) and/or services that are so "small" and/or focused that they can be considered as microservices. As understood by those of skill in the art, software services can be hosted in a cloud and/or by more traditional internet client-server architectures and/or communication protocols.

The Wikipedia entry for "software as a service" (as of 3 Dec. 2022) states in part as follows: "Software testing is the act of examining the artifacts and the behavior of the software under test by validation and verification . . . Alpha testing[.] . . . Alpha testing is simulated or actual operational testing by potential users/customers or an independent test team at the developers' site. Alpha testing is often employed for off-the-shelf software as a form of internal acceptance testing before the software goes to beta testing. Beta testing [.] . . . Beta testing comes after alpha testing and can be considered a form of external user acceptance testing. Versions of the software, known as beta versions, are released to a limited audience outside of the programming team known as beta testers. The software is released to groups of people so that further testing can ensure the product has few faults or bugs. Beta versions can be made available to the open public to increase the feedback field to a maximal number of future users and to deliver value earlier, for an extended or even indefinite period of time (perpetual beta)." (footnotes omitted)

Notwithstanding the Wikipedia definition of the previous paragraph, all testing of computer code by having end users, or human individuals acting as proxies for end users," will herein be collectively referred to as "beta testing" and/or "software testing." For example, the "alpha testing" described in the previous paragraph would be considered as a form of "beta testing" as the term "beta testing" is hereby defined for the purpose of interpreting this document.

SUMMARY

According to an aspect of the present invention, there is a method, computer program product and/or system for performing beta testing on a first software service whose functionality is offered as a service to a plurality of requesters over a communication network, that performs the following operations (not necessarily in the following order): (i) for each given requester of the plurality of requesters, assigning a beta tester status to the requester; (ii) receiving a first request, over the communication network and from a first requester of the plurality of the plurality of requesters, to use the first software service, with the request including an indication of the first requester's beta tester status; (iii) determining, by a set of machine logic rules and based, at least in part, upon the first requester's beta tester status, that the first software service will be served by a beta testing version of the first software instead of a production version of the first software service that is out of beta testing; and (iv) routing the first request to a first host that hosts a beta testing version of the first software service.

DETAILED DESCRIPTION

This Detailed Description section is divided into the following subsections: (i) The Hardware and Software Environment; (ii) Example Embodiment; (iii) Further Comments and/or Embodiments; and (iv) Definitions.

I. The Hardware and Software Environment

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As is understood by those of skill in the art, data is typically moved at some occasional points in time during normal operations of a storage device, such as during access, de-fragmentation or garbage collection, but this does not render the storage device as transitory because the data is not transitory while it is stored.

Figure 1A:
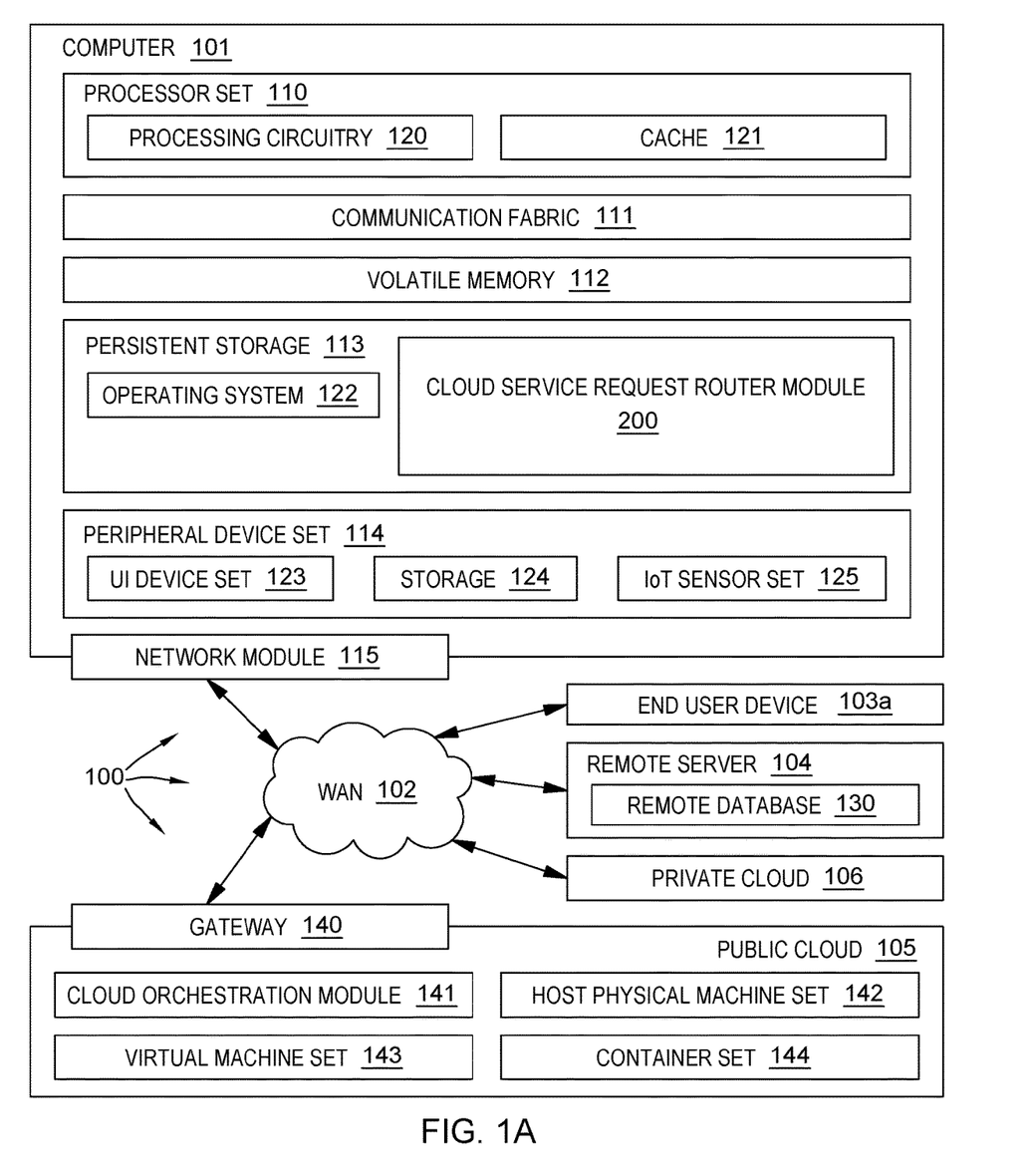
FIGS. 1A and 1B, taken together, form a block diagram of a first embodiment of a system according to the present invention.
Figure 1B:
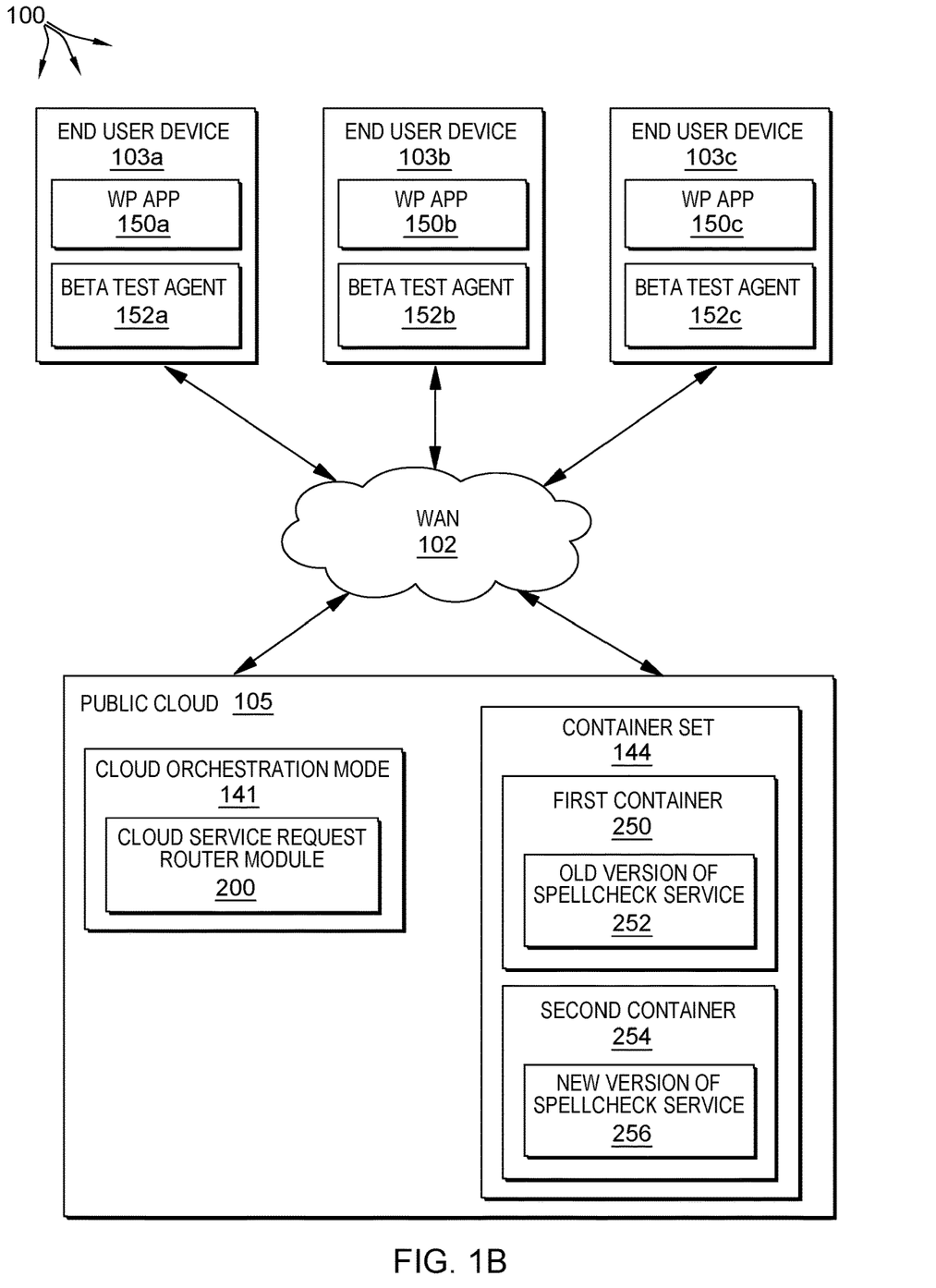

As shown in FIGS. 1A and 1B, computing environment 100 contains an example of an environment for the execution of at least some of the computer code involved in performing the inventive methods, such as cloud service request router module 200 (also herein sometimes referred to as block 200). In addition to block 200, computing environment 100 includes, for example, computer 101, wide area network (WAN) 102, three end user devices (EUDs) 103*a,b,c*, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141 (including a copy of cloud service request router module 200), host physical machine set 142, virtual machine set 143, and container set 144. Container set 144 includes: (i) first container 250 that serves as a software service an old version of spellcheck service 252; and (ii) second container 254 that serves as a software service a new version of spellcheck service 256. EUD 103*a* includes word processing (WP) app 150*a* and beta test agent 252*a*. EUD 103*b* includes word processing (WP) app 150*b* and beta test agent 252*b*. EUD 103*c* includes word processing (WP) app 150*c* and beta test agent 252*c*.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103*a, b, c* (categorically referred to as EUD 103) is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

II. Example Embodiment

Figure 2:
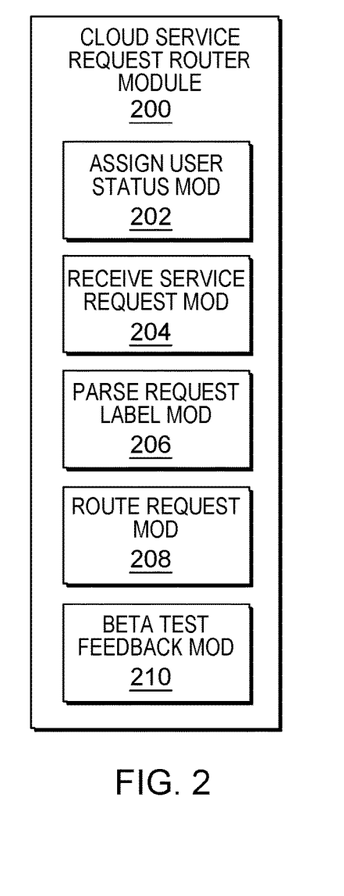
FIG. 2 is a block diagram showing a machine logic (for example, software) portion of the first embodiment system.
Figure 3:
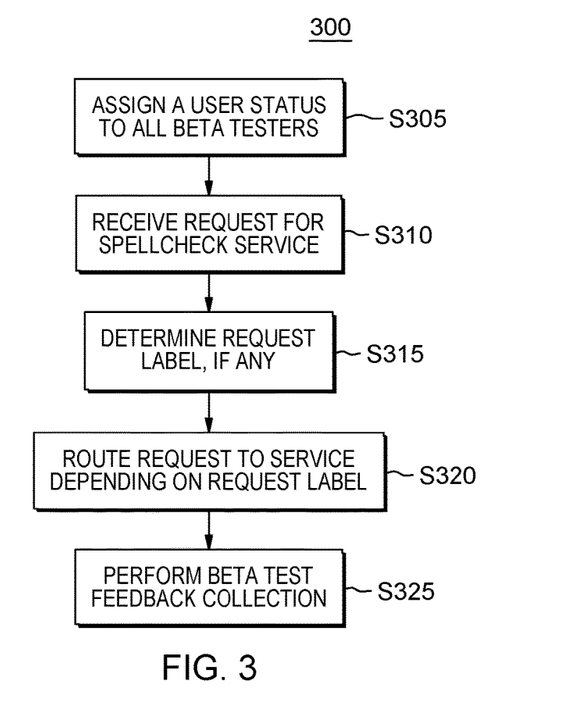
FIG. 3 is a flowchart showing a first embodiment method performed, at least in part, by the first embodiment system.

Computing environment 100 is an environment in which an example method according to the present invention can be performed. As shown in FIG. 3, flowchart 300 shows an example method according to the present invention. As shown in FIG. 2, module 200 performs or control performance of at least some of the method operations of flowchart 300. Before discussing the operations of flow chart 300, the computing context for this particular embodiment is a set of three systemwide users who are using a word processing app 150a, b, c on their respective smart phones (EUDs 103a,b,c) While this app largely operates locally and independently, being implemented locally on each users smart phone. However, in this particular embodiment, the word processing app implements its spell checker functionality by calling a cloud based service 252, 256 from public cloud 105 on demand on behalf of each of the three (3) users as they perform spell checks. It is noted that the SaaS services, cloud services, microservices and cloud microservices to which various embodiments of the present invention may be helpfully applied are by no means limited to spell checkers and/or word processing functionality. In this respect of the particular subject matter of the functionality being requested, the following example should be considered as a pedagogical example designed so that it is easy for the reader to conceptualize the service calls and not because the present invention has any sort of special particularized connection to the computer spell checker arts.

Processing begins at operation S305, where assign user status module ("mod") 202 of cloud service request router mod 200 of cloud orchestration mod 141 of public cloud 105 assigns each user (that is, the respective users of EUDs 103a,b,c) a beta tester status. In this example, the three possible statuses are as follows: (i) beta tester, first level (#BETALVL1); (ii) beta tester, second level (#BETALVL2); and (iii) not a beta tester (#NOBETA). In this example, the status for each user is determined by factors such as whether the user has applied to act as a beta tester, and the user's level of experience with the type of software being beta tested (here, software for spellchecker functionality). In this example, BETALVL #1 testers have more experience with spellchecker software than do the level two beta testers. The non-beta testers either did not apply, or lese did not have the subject matter experience/acumen required to be a level two beta tester. Each user's beta tester status is stored in the beta tester agent 152a,b,c on their respective smart phones 103a,b,c.

Alternatively, some embodiments will have only a single class of beta tester, or additional levels.

Alternatively, some embodiments may assign beta tester status automatically by operation of the system software. As an example of this, in the following sub-section of this Detailed Description section, user behavior tags are automatically assigned to users based on their interactions with various historically-observed types of interactions with various types of functionality that may require a beta test. Artificial intelligence may be used to assign beta tester status. If beta tester status, and/or user behavior tags, is determined automatically then it may, in some embodiments, be updated frequently and/or dynamically.

Alternatively, some embodiments may assign beta tester status only to beta testers, meaning that non-beta-testers would be assigned their status by virtue of not having been designated as some sort of beta tester.

Processing proceeds to operation S310 where receive service request mod 204 receives a request from the user of EUD 103a to use the cloud based spellchecker service hosted on public cloud 105 at containers 250, 254. This request includes a request label that indicates the beta tester status of the user of EUD 103a. In this example, that label, inserted into the request by beta test agent 152a when the request for the spellchecker was made, is #BETALVL1, indicating that the beta tester status of the user is first level beta tester.

Processing proceeds to operation S315, where parse request mod 206 parses the #BETALVL1 tag out of the larger request.

Processing proceeds to operation S320, where route request mod 208 routes the spellchecker service request to the appropriate version of the spellchecker service depending upon rules programmed into mod 206. More specifically, in this example, there is an old version of the spellchecker 252 that is no longer in beta testing phase and a new version of the spellcheck service 256 that is still undergoing beta testing. For this kind of case, the operative routing rule programmed into mod 206 is as follows: (i) request is routed to new version if the new version has received less than ten (10) instances of feedback and the requester is a first level beta tester; (ii) request is routed to new version if the new version has received at least ten (10) instances of feedback, no more than twenty-five (25) instances of feedback and the requester is a second level beta tester; and (iii) request is otherwise routed to the old version of the service. In this example, new version of spellcheck service 256 has only five (5) previous instance of feedback and the requester is a first level beta tester, so the request will be routed to the new version 256.

Processing proceeds to operation S320 where the new version of the spellcheck service is used to perform the user's request and report the output back to word processing app 150a on EUD 103a.

Processing proceeds to operation S325 where beta test feedback mod 210 requests and receives feedback from the first level beta tester using EUD 103a. In this case the feedback is that the spellchecker was flagging British variant spellings as incorrect, which the first level beta tester considers as a problem.

While the above example of flow chart 300 was explained in terms of a service request from the user of device 103a, if a similar request had been received from one of the other users, then the result would have been as follows: (i) request from the second level beta user would have been routed to old version of the spellcheck service 252; and (ii) request from the second level beta user would have been routed to old version of the spellcheck service 252. This will change after first level beta testers have left ten (10) pieces of feedback, and this will change again after 15 more pieces of feedback are received from second level beta testers when the beta testing is considered as complete and the new version of the spellcheck service "goes live."

III. Further Comments and/or Embodiments

During consideration for a new computer and/or software based functionality, typically feedback is obtained from the users before deployment of the new functionality begins at scale. Generally, beta applications/apps (applications should be interpreted to include apps as well as any other type of application) are released first. However, there is a chance that the quality and/or content of the feedback is less than optimal because the application/app has not been tested by regular users. Instead, applications/apps are tested by testers/developers/people with technical knowledge and who can be trusted using beta applications on their systems.

Some embodiments of the present invention recognize one, or more, of the following facts, potential problems and/or potential areas for improvement with respect to the current state of the art: (i) implementing new functionality in an application is very common; (ii) at the same time, there is typically concern over whether or not the application will be accepted and widely used by users; (iii) getting the application tested or making it reach the right audience is very important; (iv) with the CI/CD (continuous integration and continuous delivery) process gaining more traction, using deployment models like canary (the traditional canary deployment model) has limitations in determining strategies for migrating user traffic; and/or (v) the canary development model is randomized which can cause loss of customer trust.

A method according to an embodiment of the present invention includes the following operations (not necessarily in the following order): (i) predicts a set of classified customer groups; (ii) routes/loads incoming traffic to a specific application container or a specific new feature addition within the container by labelling them using an AI (artificial intelligence) system based on a history feedback loop; (ii) uses a server to communicate with a client agent through short polling about adding a "labels required" flag to selective functional calls that are recently deployed to the server; (iii) the client sends the behavioral-functional labels for those functional calls as part of a request object after the deployment until go-live; and (iv) has auto enabled 100% traffic routing (go live) for the containers selectively based on the collected seamless feedback from the appropriate users through the polled client agent once a predefined threshold is reached. The difference between seamless and non-seamless feedback will now be discussed. Seamless feedback refers to a system taking user gestures and usage patterns as expressions to derive the relationship of user with functionality. In another embodiment, the user can also give feedback by entering text.

The difference between a classified and unclassified customer group will now be discussed. A classified customer group is a group of client users who fall into the same category. The category is based on the association of functionally of similar users. This is self-identified by using the behavioral labels.

Traffic routing is different before and after "go live." More specifically, a preliminary period starts with a deployment of new functionalities in a set of containers and continuing up until go-live—the preliminary period is the period when full traffic is not routed to the newer fixes/functionality. In the preliminary period, the client agent sends behavioral-functional labels in each request object so that rules can be selectively applied based on the behavior-functional labels. These rules determine which requests to go to which respective containers and further determine the go/no-go call for the current deployment. After go-live the traffic routing changes because there are no longer any additional labels in the request object as all traffic is routed to the same set of containers.

Some embodiments of the present invention may include one, or more, of the following operations, features, characteristics and/or advantages: (i) utilizes an AI enabled cloud deployment and load system: (ii) uses historical performance data as feedback to improve the automated AI system that generates labels; (iii) predicts classified customer groups; (iii) routes/loads incoming traffic to a specific application container or a specific new feature within the container; and/or (iv) uses an automated AI system which generates the labels for the functional containers in a microservice architecture with self-identified functional units of the application by analyzing the code repository and adding the appropriate labels to the containers where they belong.

The AI enabled cloud deployment is the code contributing to functional changes. The AI enabled cloud here refers to the CI/CD deployment and auto tagging the functionality with the appropriate functional labels and deploying the old (Vs) new code to the containers and tagging the containers with functional tags. After deployment is done, the rule is applied using behavioral labels until go-live and then all traffic is switched to one set of containers.

In load balancing, the kinds of loads that are balanced requests come from the clients and are the first reaching the "Load Balancer" which will distribute the requests/traffic to different servers/containers in the server ecosystem.

Information that is fed back will now be described. Feedback is the user interaction with the functionality. Typically, different pieces of software have many different functionalities, with some types of functionality being more important and/or frequently used by a given user. This is based on historical usage of the user for that software and his interaction levels.

Functional containers will now be described. A functional container is the place where a given piece of software functionality is deployed. In some embodiments, functional tagging is applied for each container, and containers tagged with functional tagging are sometimes herein referred to as "functional containers."

Analyzing the code repository will now be discussed. Analyzing the code repository is about analyzing code check-in's history, related pattern and textual analysis on associated RTC (real-time communication)/salesforce documents for the entire code repository with respect to functionality. This in turn be used to tag containers after deployment.

Some embodiments of the present invention may include one, or more, of the following operations, features, characteristics and/or advantages: (i) utilizes AI based client agent markers that mark users with multiple labels by analyzing their behavior including time spent with the application, at several functional components, over a period of time; (ii) users can intentionally express their feedback about functionality with a simple gesture/textual or short survey; (iii) the client agent generates the user behavior analysis while accessing the functionality using an integrated wearable gesture and gaze analysis techniques; (iv) labels attached to the user-functionality will have information on beta load taken from the user in the past; and/or (v) if the user has tested the beta the last four (4) times on a new functionality. this will be the beta load. As stated above, if the user has tested the beta the last four (4) times on a new functionality, a client will receive data from the user, processes it and labels the user based on behavior with the application feedback received. Based on the labels, the requests from the user will be routed to respective containers, either the one with new functionality (beta) or the actual production.

Some embodiments of the present invention may include one, or more, of the following operations, features, characteristics and/or advantages: (i) communicates with the client agent through short polling by adding a "labels required" flag to selective functional calls that were recently deployed to the server; (ii) the client sends the behavioral-functional labels for the functional calls as part of the request object, after deployment, and until it goes live; and/or (iii) uses a smart canary based load balancing deployment strategy that allows the ability to configure the rules, such that traffic can be routed to the appropriate containers with dynamic label mapping between the application functional labels derived from the server side code repository verses behavioral-functional labels being part of the request object.

Some embodiments of the present invention may include one, or more, of the following operations, features, characteristics and/or advantages: (i) the chances of breaking user trust on an application is reduced; (ii) improves the real users feedback; (iii) if a container is deployed with the old code and no changes are made from the last deployment, then that container will go live for all the users without any smart balancing; (iv) smart load balancing comes into play for those containers which are affected in a recent release; and/or (v) automated enabling of 100% traffic routing (go live) for the containers is selectively based on the collected feedback from the appropriate users through the polled client agent. The user's feedback is improved when the user centric application is deployed based on the user's feedback. The next time feedback is collected from same user, it will be improved.

Some embodiments of the present invention may include one, or more, of the following operations, features, characteristics and/or advantages in reference to a smart CI/CD pipeline: (i) the software component is developed in a micro-services fashion; (ii) each software capability feature will be divided into micro-services and will package as few different container image labels as possible with different meta information (for example, basic, standard, premier, etc.); (iii) builds and deploys each different feature label based on the target feedback customer group; (iv) deployment of each micro-service feature is enabled based on a pre-defined business rule policy per customer feedback results (for example, more than 50% satisfied will trigger feature enablement); (v) real-time customer feedback is collected (that is, seamless and non-seamless feedback) with each different label group through a multi-channel ranging from standard web popup poll questions, to social post language tone analysis, to facial expression analysis from VR (virtual reality) environment interaction; and/or (vi) utilizes an AI system to analyze all the feedback data from multi-channels related to the same feature label and provide input to the smart CI/CD pipeline to adjust the target deployment model (for example, the ability to switch some service route endpoints using a load balancer).

Some embodiments of the present invention may include one, or more, of the following operations, features, characteristics and/or advantages: (i) when old and new containers are running in a micro-service/functionality, and a new deployment has been triggered by the CI-CD pipeline, the system will merge the existing "new container" with the upcoming "newer container" and spin off the container and the spun off container will include both generations of changes; (ii) allows the incremental routing to the new container instead of flipping them all at once; and/or (iii) includes a customized rule configuration for defining the incremental movements for routing to the new container.

Some embodiments of the present invention may include one, or more, of the following operations, features, characteristics and/or advantages: (i) when the application is being developed by numerous developers for different functionalities and the code is being checked into the code repositories such as GIT (global information tracker), the system will create the labels for the application functional units; (ii) when the code is deployed into the containers in a micro-service architecture, the containers will carry the functional labels such as chat-module, emoji-module, etc.; (iii) there is a client side agent (can be a simple script) that will keep analyzing the user behavior while interacting with different functionalities of the application; (iv) based on the identified user behavior, the client agent will mark the user behavior-functional labels such as excited-chat module, keen-chat module, just checking-comment module, etc. (where the left portion is the behavior and right portion is the functional label); and/or (v) the client agent polls the server and in that poll, requests the server to send the information about newly deployed functional labels.

Some embodiments of the present invention may include one, or more, of the following operations, features, characteristics and/or advantages: (i) after the new deployment happens and until go live, any request that is sent from the client to the server against the functionalities that were newly deployed will add "behavior-functional" labels as part of the request object; (ii) if the user is using a functionality that is not recently deployed, the labels would not be part of request object; and/or (iii) the user can configure a rule at a load balancer level (for example, the rule could be: "route all excited, savvy-explore, happy customers to the new code after the deployment and make the container go 100% live after receiving 60% positive feedback from the users of that functionality, or if 50% negative feedback is received, then rollback").

Some embodiments of the present invention may include one, or more, of the following operations, features, characteristics and/or advantages: (i) the load balancer will review the request object and check for the behavioral-functional labels; (ii) if the configured rule matches the labels in the request object, the system routes the request to the container with new code, otherwise the system routes the request to the container with old code; (iii) after the users starts using the new functionality based on the positive response received by the users from polling, the load balancer will move the container to 100% go-live; (iv) if the received feedback is negative, as per rule, the deployment is rolled back and/or (v) creates business solutions based on real time customer feedback.

The business solutions that are created are solutions where the user acceptability is high, where the solutions are rolled out based on the feedback from various users. User centric designs are current and futuristic for any software and this is a feature that any software can adopt, including cloud offerings.

Figure 4:
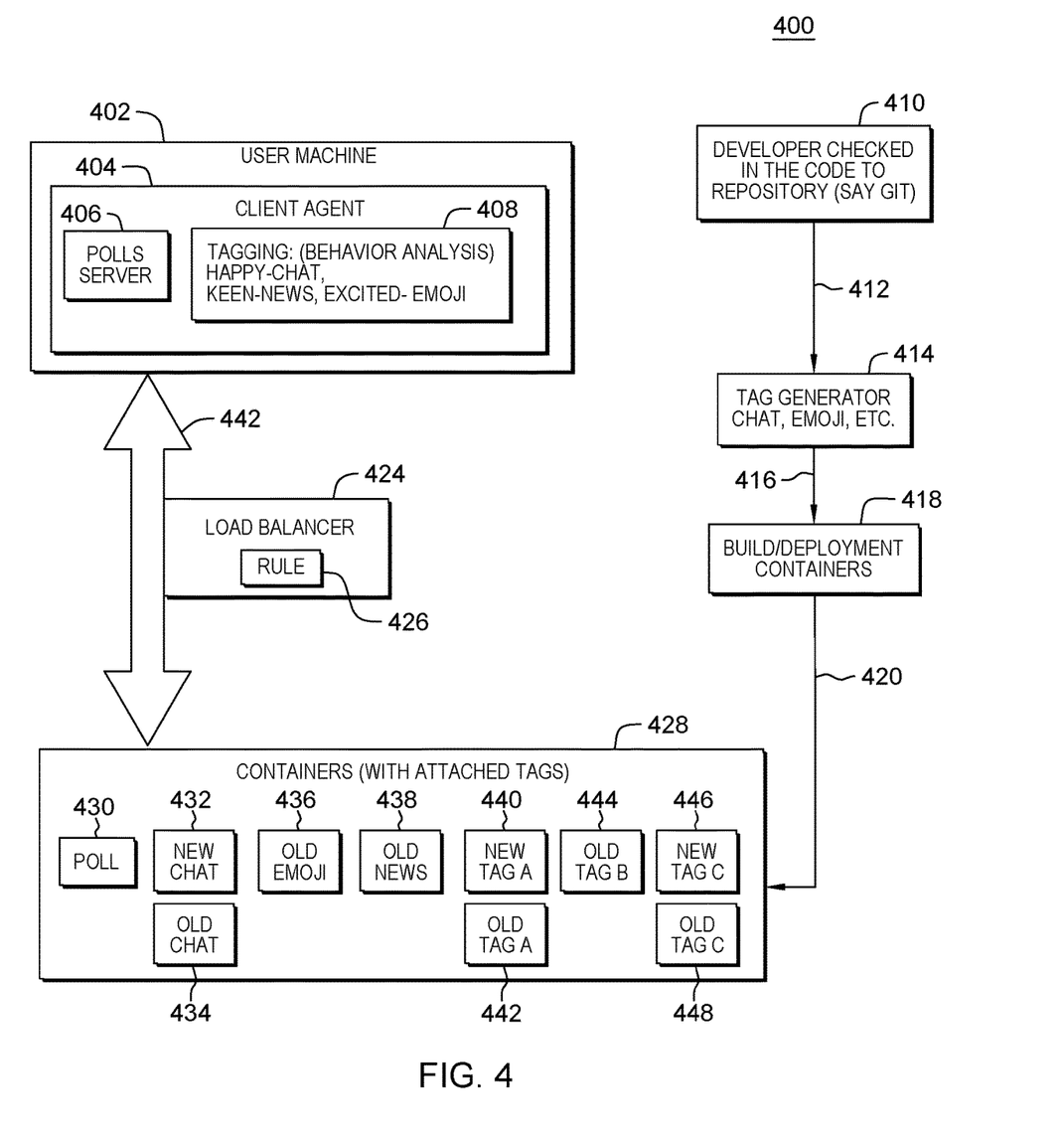
FIG. 4 is a block diagram of a second embodiment of a system according to the present invention.

As shown in FIG. 4, diagram 400 includes: user machine block 402; client agent block 404; polls server block 406; tagging: (behavior analysis, happy-char, keen-news, excited-emoji block 408; developer checked in the code to repository (say GIT) block 410; CI/CD pipeline first segment communication path 412; tag generator, chat, emoji, etc. block 414; CI/CD pipeline second segment communication path 416; build deployment containers block 418; communication path for deploying new code 420; communication path 422 (for new deployment—chat, tag A, tag C from load balancer 424 to user machine 402 and to send feedback from user machine 402 to load balancer 424); load balancer block 424; rule block 426 (for example: "route all excited, savvy-explore, happy customers to the new code after the deployment and make the container go 100% live after receiving 60% positive feedback from the users of the functionality, if 50% of negative feedback is received rollback"; containers (with attached tags) block 428; poll block 430; new chat block 432; old chat block 434; old emoji block 436; old news block 438; new tag A block 440; old tag A block 442; old tag B block 444; new tag C block 446; and old tag C block 448.

Some embodiments of the present invention may include one, or more, of the following operations, features, characteristics and/or advantages: (i) enables a smart canary-based load balancing deployment strategy that allows the ability to configure the rules; (ii) traffic can be routed to the appropriate containers with dynamic label mapping between the application functional labels derived from server-side code repository verses behavioral-functional labels being part of the request object; (iii) chances of breaking user trust on the application is reduced; (iv) improves the real user's feedback which caters respective users; and/or (v) functionality associated with the each container is labeled along with its version.

The term "caters respective users" stated above refers to requests from users in the classified group where users were tagged, based on their behaviour, that will be forwarded to respective functional containers.

Some embodiments of the present invention may include one, or more, of the following operations, features, characteristics and/or advantages: (i) each request coming from the client to the server would carry which functionality is being requested and the end-user behavior trait associated with that functionality, which is identified using the behavioral analysis module using an agent at the clients end; (ii) combing the user behavioral trait and the functionality, the smart rule can be configured to choose the kind of end users to route the traffic to and also chose the version of the container; and/or (iii) uses auto-enabled 100% traffic routing (go live) for the containers selectively based on the collected seamless feedback from the appropriate users through the polled client agent once a predefined threshold is reached.

Some embodiments of the present invention may include one, or more, of the following operations, features, characteristics and/or advantages: (i) includes predicting classified customer groups and routing/load balancing of incoming traffic to a specific application container or a specific new feature within the container by labelling them using an AI system based on the use of a history feedback loop; (ii) includes implementing a server to communicate with the client agent through short polling by adding a "labels required" flag to selective functional calls that are recently deployed to the server; and/or (iii) sends the behavioral-functional labels for those functional calls as part of the request object after the deployment until go-live.

Some embodiments of the present invention may include one, or more, of the following operations, features, characteristics and/or advantages: (i) classifies the customer groups; (ii) routes the incoming traffic to a specific application container after marking users with multiple labels by analyzing their usage behavior of the application and its features using an AI-based client agent that runs on the client machine; (ii) includes behavior analytics that defines the user verses a functionality behavioral trait which routes the traffic to the appropriate versions of functional containers based on smart rules configured in conjunction with behavioral analytics; (iii) enables traffic routing for containers based on the feedback from the appropriate users through the client agent; (iv) uses incremental traffic routing to the new containers; (v) does not include rule configuration for defining incremental movements for routing traffic to a new container; (vi) implements cloud deployment based on learnings obtained by monitoring other cloud deployments; (vii) routes the network traffic within data centers using load balancers; and/or (viii) enables a graph behavior modeler to take feedback from users and adjust the model as per feedback.

The term "incremental traffic" stated above is when the number of classified group members increases, the traffic gets increased to the respective containers, thus scaling them up in an "as needed" basis.

Some embodiments of the present invention may include one, or more, of the following operations, features, characteristics and/or advantages: (i) implements AI enabled cloud deployment based on a history feedback loop and deployment of new functionality to a containerized system on which traffic was routed to a specific user group and labelled based on their behavioral use of application over a period of time; (ii) generates automated labels to the functional containers or users; (iii) enables 100% traffic routing based on collected feedback; (iv) uses a smart CI/CD pipeline where building and deploying each feature is based on the feedback from customer groups; and/or (v) uses incremental routing of traffic to the container having a new feature.

Some embodiments of the present invention may include one, or more, of the following operations, features, characteristics and/or advantages: (i) implements a smart CI/CD pipeline software component developed using micro-services where each software capability feature is divided into micro-services and package including different container image labels with different meta info (for example, basic, standard, premier, etc.); (ii) builds and deploys different feature labels based on the target feedback customer group; (iii) enables deployment of micro-service features based on pre-defined business rule policy and also based on the results of customer feedback (for example, more than 50% will satisfy the trigger feature enablement); and/or (iv) collects real-time customer feedback with each different label group through a multi-channel, ranging from standard web popup poll questions, to social post language tone analysis, to facial expression analysis from a VR interaction.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Set of thing(s): does not include the null set; "set of thing(s)" means that there exist at least one of the thing, and possibly more; for example, a set of computer(s) means at least one computer and possibly more.

What is claimed is:

1. A computer-implemented method (CIM) for performing beta testing of a first software service whose functionality is offered as a service to a plurality of requesters over a communication network, the CIM comprising:
   identifying the plurality of requesters for the first software service, wherein each requester is associated with a device that operates an application associated with the first software service;
   for each requester of the plurality of requesters, automatically assigning a beta tester status to the requester for the first software service, wherein the beta tester status comprises a beta tester level;
   receiving a first request, over the communication network and from a first requester of the plurality of the plurality of requesters, to use the first software service, with the request including an indication of the first requester's beta tester level;
   determining, by a set of machine logic rules and based, at least in part, upon the first requester's beta tester level, that the first software service will be served by a beta testing version of the first software instead of a production version of the first software service that is out of beta testing; and
   routing, based on the determining, by the first software service and in response to the first request, the beta testing version of the first software to a first device of the first requester that is using the application.

2. The CIM of claim 1 further comprising:
   responsive to the routing of the first request, performing, by the beta testing version of the first software service hosted on the first device for the first requester to obtain output data; and
   outputting, over the communication network and to the first requester, the output.

3. The CIM of claim 2:
   receiving feedback data from the first requester with the feedback data including an indication of an assessment of the performance of the first software service by the beta testing version.

4. The CIM of claim 1:
   receiving feedback data from the first requester with the feedback data including an indication of an assessment of the performance of the first software service by the beta testing version.

5. The CIM of claim 1 wherein:
   the first software service is a microservice; and
   the beta testing version hosted by the first device is implemented in a first container.

6. The CIM of claim 1 wherein the first request includes a predefined behavior user label to indicate the beta tester status assigned to the first requester.

7. The CIM of claim 1, wherein the beta tester level for each requester of the plurality of requesters is based a number of instances of feedback given by the requester.

8. A computer program product (CPP) for performing beta testing on a first software service whose functionality is offered as a service to a plurality of requesters over a communication network, the CPP comprising:
   a set of storage device(s); and
   computer code stored collectively in the set of storage device(s), with the computer code including data and instructions to cause a processor(s) set to perform at least the following operations:
   identifying the plurality of requesters for the first software service, wherein each requester is associated with a device that operates an application associated with the first software service;
   for each requester of the plurality of requesters, automatically assigning a beta tester status to the requester for the first software service, wherein the beta tester status comprises a beta tester level;
   receiving a first request, over the communication network and from a first requester of the plurality of requesters, to use the first software service, with the request including an indication of the first requester's beta tester level;
   determining, by a set of machine logic rules and based, at least in part, upon the first requester's beta tester level, that the first software service will be served by a beta testing version of the first software instead of a production version of the first software service that is out of beta testing; and
   routing, based on the determining, by the first software service and in response to the first request, the beta testing version of the first software to a first device of the first requester that is using the application.

9. The CPP of claim 8 wherein the computer code further includes instructions for causing the processor(s) set to perform the following operation(s):
   responsive to the routing of the first request, performing, by the beta testing version of the first software service hosted on the first device for the first requester to obtain output data; and
   outputting, over the communication network and to the first requester, the output.

10. The CPP of claim 9:
receiving feedback data from the first requester with the feedback data including an indication of an assessment of the performance of the first software service by the beta testing version.

11. The CPP of claim 8:
receiving feedback data from the first requester with the feedback data including an indication of an assessment of the performance of the first software service by the beta testing version.

12. The CPP of claim 8 wherein:
the first software service is a microservice; and
the beta testing version hosted by the first device is implemented in a first container.

13. The CPP of claim 8 wherein the first request includes a predefined behavior user label to indicate the beta tester status assigned to the first requester.

14. A computer system (CS) for performing beta testing on a first software service whose functionality is offered as a service to a plurality of requesters over a communication network, the CS comprising:
a processor(s) set;
a set of storage device(s); and
computer code stored collectively in the set of storage device(s), with the computer code including data and instructions to cause the processor(s) set to perform at least the following operations:
identifying the plurality of requesters for the first software service, wherein each requester is associated with a device that operates an application associated with the first software service;
for each requester of the plurality of requesters, automatically assigning a beta tester status to the requester for the first software service, wherein the beta tester status comprises a beta tester level;
receiving a first request, over the communication network and from a first requester of the plurality of the plurality of requesters, to use the first software service, with the request including an indication of the first requester's beta tester level;
determining, by a set of machine logic rules and based, at least in part, upon the first requester's beta tester level, that the first software service will be served by a beta testing version of the first software instead of a production version of the first software service that is out of beta testing; and
routing, based on the determining, by the first software service and in response to the first request, the beta testing version of the first software to a first device of the first requester that is using the application.

15. The CS of claim 14 wherein the computer code further includes instructions for causing the processor(s) set to perform the following operation(s):
responsive to the routing of the first request, performing, by the beta testing version of the first software service hosted on the first device for the first requester to obtain output data; and
outputting, over the communication network and to the first requester, the output.

16. The CS of claim 15:
receiving feedback data from the first requester with the feedback data including an indication of an assessment of the performance of the first software service by the beta testing version.

17. The CS of claim 14:
receiving feedback data from the first requester with the feedback data including an indication of an assessment of the performance of the first software service by the beta testing version.

18. The CS of claim 14 wherein:
the first software service is a microservice; and
the beta testing version hosted by the first device is implemented in a first container.

19. The CS of claim 14 wherein the first request includes a predefined behavior user label to indicate the beta tester status assigned to the first requester.

* * * * *